US010350566B2

(12) United States Patent
Rathke et al.

(10) Patent No.: US 10,350,566 B2
(45) Date of Patent: Jul. 16, 2019

(54) REACTOR APPARATUS FOR DEHYDROGENATING A CARRIER MEDIUM

(71) Applicant: HYDROGENIOUS TECHNOLOGIES GmbH, Erlangen (DE)

(72) Inventors: Jonas Rathke, Penzberg (DE); Matthias Kusche, Schwaig (DE); Federico Westerath, Altdorf (DE); Berthold Melcher, Erlangen (DE); Cornelius Randig, Erlangen (DE)

(73) Assignee: HYDROGENIOUS TECHNOLOGIES GMBH, Erlangen (DE)

( * ) Notice: Subject to any disclaimer, the term of this patent is extended or adjusted under 35 U.S.C. 154(b) by 0 days.

(21) Appl. No.: 15/766,218

(22) PCT Filed: Oct. 6, 2016

(86) PCT No.: PCT/EP2016/073896
§ 371 (c)(1),
(2) Date: Apr. 5, 2018

(87) PCT Pub. No.: WO2017/060361
PCT Pub. Date: Apr. 13, 2017

(65) Prior Publication Data
US 2018/0290117 A1    Oct. 11, 2018

(30) Foreign Application Priority Data
Oct. 6, 2015    (DE) .................. 10 2015 219 305

(51) Int. Cl.
*B01J 8/06* (2006.01)
*B01J 8/22* (2006.01)
(Continued)

(52) U.S. Cl.
CPC ................. *B01J 8/067* (2013.01); *B01J 8/06* (2013.01); *B01J 8/22* (2013.01); *C01B 3/0015* (2013.01);
(Continued)

(58) Field of Classification Search
CPC .. B01J 8/065; B01J 8/067; B01J 2208/00176; B01J 2208/00212; B01J 2208/00221; B01J 2219/182
See application file for complete search history.

(56) References Cited

U.S. PATENT DOCUMENTS 2,518,583 A    8/1950    Watson
2,562,857 A    7/1951    Adrien et al.
(Continued)

FOREIGN PATENT DOCUMENTS

DE    10 2005 050 283 A1    4/2007
EP    0 157 463 A2    10/1985
(Continued)

*Primary Examiner* — Lessanework Seifu
(74) *Attorney, Agent, or Firm* — McGlew and Tuttle, P.C.

(57) ABSTRACT

A reactor apparatus for dehydrogenating a carrier medium includes a reactor housing, an interior space which is enclosed by the reactor housing and includes a preliminary space, which has an inflow opening for inflow of loaded carrier medium into the preliminary space and at least one first connecting opening for outflow of the carrier medium from the preliminary space, and includes a reaction space connected via the at least one first connecting opening to the preliminary space. The reactor apparatus additionally has a heat transfer space which is arranged between the reactor housing and the reaction space and contains a heat transfer medium for transfer of heat from the heat transfer medium to the carrier medium.

23 Claims, 6 Drawing Sheets

(51) Int. Cl.
*C01B 3/00* (2006.01)
*C01B 3/26* (2006.01)

(52) U.S. Cl.
CPC ....... *C01B 3/26* (2013.01); *B01J 2208/00132* (2013.01); *B01J 2208/00221* (2013.01); *B01J 2219/00015* (2013.01); *B01J 2219/182* (2013.01); *Y02E 60/324* (2013.01)

(56) References Cited

U.S. PATENT DOCUMENTS

| | | | |
|---|---|---|---|
| 2,562,858 | A | 7/1951 | Adrien et al. |
| 2,986,454 | A | 5/1961 | Jewett |
| 4,894,205 | A * | 1/1990 | Westerman ................ B01J 8/06 261/112.1 |
| 5,266,281 | A | 11/1993 | Kao et al. |
| 6,767,376 | B1 | 7/2004 | Perna et al. |
| 7,351,395 | B1 * | 4/2008 | Pez ...................... C01B 3/0015 206/7 |
| 7,807,116 | B2 | 10/2010 | Gerlinger et al. |

FOREIGN PATENT DOCUMENTS

| | | |
|---|---|---|
| EP | 1 475 349 A2 | 11/2004 |
| FR | 1 192 370 A | 10/1959 |
| WO | 02/02220 A1 | 1/2002 |
| WO | 2004/047980 A1 | 6/2004 |
| WO | 2004/052776 A1 | 6/2004 |
| WO | 2006/061409 A1 | 6/2006 |
| WO | 2006/109095 A1 | 10/2006 |

* cited by examiner

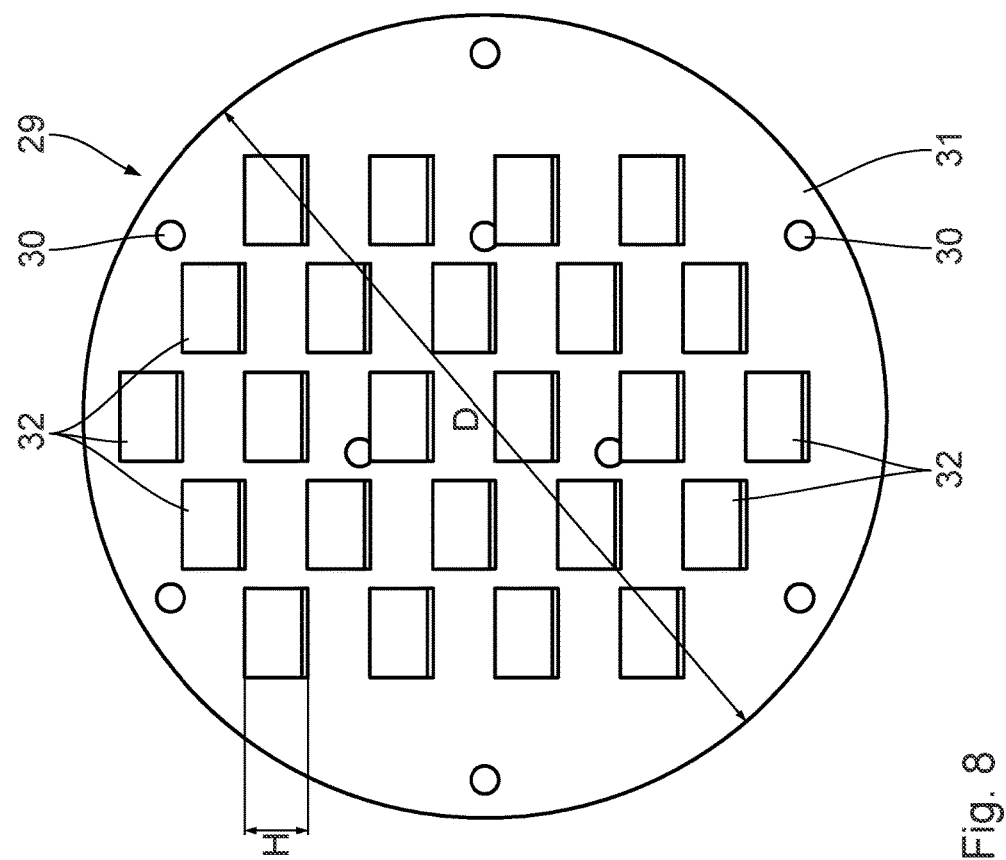
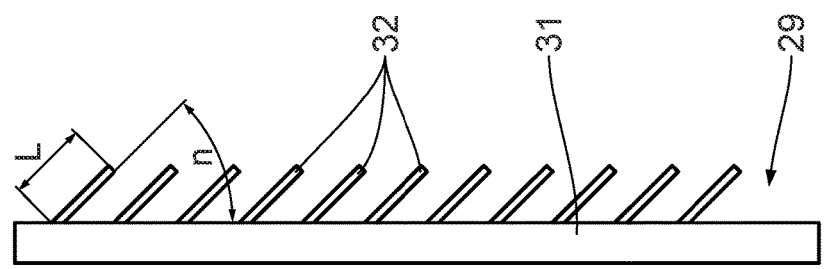

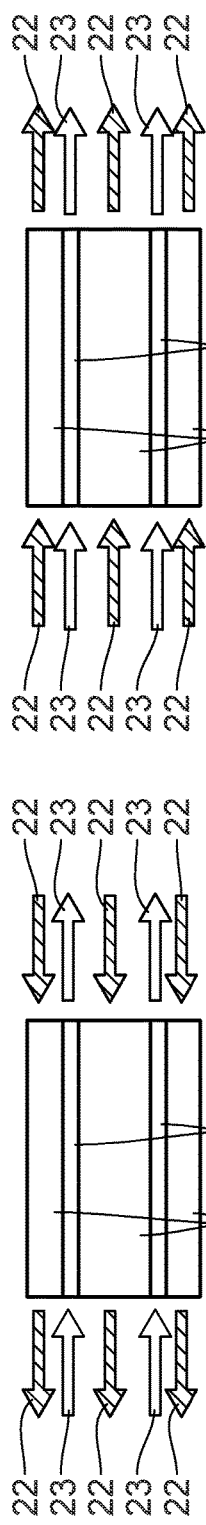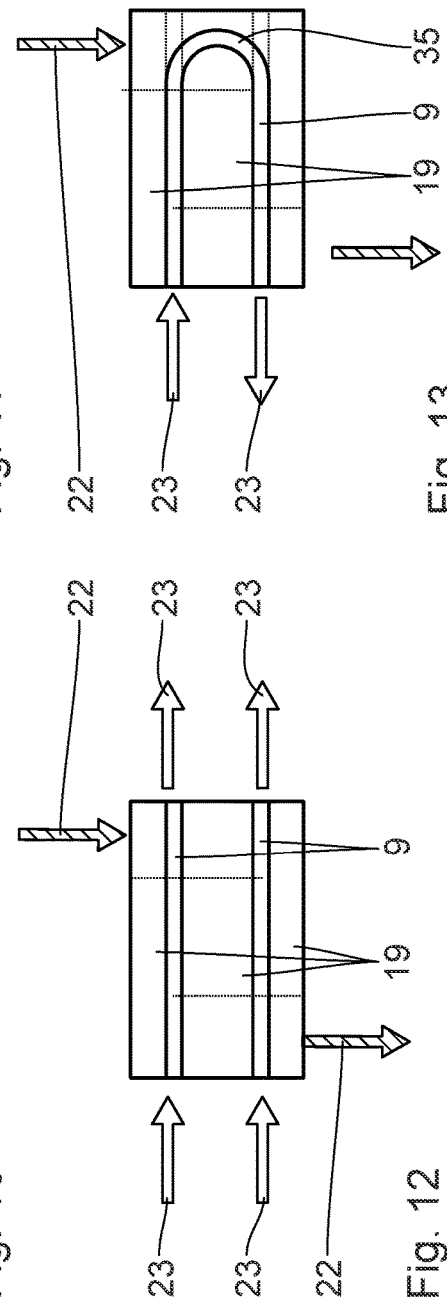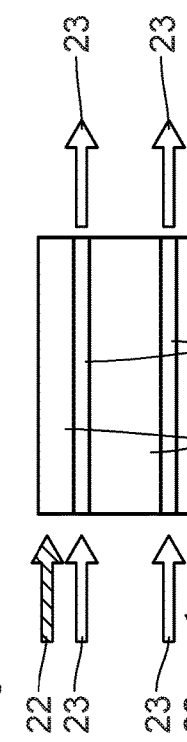

REACTOR APPARATUS FOR DEHYDROGENATING A CARRIER MEDIUM

CROSS REFERENCE TO RELATED APPLICATIONS

This application is a United States National Phase Application of International Application PCT/EP2016/073896, filed Oct. 6, 2016, and claims the benefit of priority under 35 U.S.C. § 119 of German patent application Serial No. DE 10 2015 219 305.5 filed on Oct. 6, 2015, the entire contents of which are incorporated herein by reference.

FIELD OF THE INVENTION

The invention relates to a reactor apparatus for dehydrogenating a carrier medium.

BACKGROUND OF THE INVENTION

The dehydrogenation reaction of a carrier medium is endothermic, i.e. heat has to be supplied. This can be effected by means of a shell-and-tube reactor in order to make a ratio of surface area to volume of the reactor required for introduction of heat possible. The ratio of surface area to volume is greater, i.e. better, the smaller the respective tube diameter. However, a small tube diameter means a reduced tube cross section, so that the liberation of hydrogen gas is hindered.

SUMMARY OF THE INVENTION

It is an object of the invention to improve a reactor apparatus for dehydrogenating a carrier medium, with, in particular, the liberation of hydrogen gas being made possible essentially unhindered at a satisfactory heat input.

The object is achieved by a reactor apparatus for dehydrogenating a carrier medium, comprising a reactor housing, an interior space which is enclosed by the reactor housing and comprises a preliminary space, which has an inflow opening for inflow of loaded carrier medium into the preliminary space and at least one first connecting opening for outflow of the carrier medium from the preliminary space, and a reaction space connected via the at least one first connecting opening to the preliminary space, and a heat transfer space which is arranged between the reactor housing and the reaction space and contains a heat transfer medium for transfer of heat from the heat transfer medium to the carrier medium.

The key aspect of the invention is that an interior space enclosed by a reactor housing has at least one reaction space which is connected to a preliminary space. The preliminary space has at least one first connecting opening. The preliminary space is connected in each case to a reaction space via the at least one first connecting opening. It is also conceivable for a plurality of reaction spaces to be connected to the preliminary space via the at least one first connecting opening, for example by a distributor space being arranged between the first connecting opening and the plurality of reaction spaces. The at least one first connecting opening serves for outflow of a carrier medium from the preliminary space into the reaction space connected thereto. The preliminary space additionally has an inflow opening which serves for inflow of loaded carrier medium into the preliminary space. The carrier medium is, in particular, an organic hydrogen storage liquid in the form of a cyclic hydrocarbon. The carrier medium is a hydrogen carrier medium. Hydrogen can be chemically bound to the carrier medium. The carrier medium is liquid. Such a carrier medium is, for example, known under the name liquid organic hydrogen carrier (LOHC). The reactor apparatus has a reactor housing. A heat transfer space is arranged between the reactor housing and the reaction space. A heat transfer medium in the heat transfer space serves for transferring heat from the heat transfer medium to the carrier medium. The heat transfer space is, in particular, an intermediate space between the at least one reaction space and the reactor housing. The carrier medium which is at least partly loaded with hydrogen gas can get via the preliminary space into the reaction space, with, in particular, a distance between the inflow opening and the at least one connecting opening having virtually no influence on the flow of the carrier medium, in particular the flow velocity thereof. Targeted and controlled introduction of the carrier medium into the reaction space is possible by means of the preliminary space.

A reactor apparatus having a plurality of reaction tubes, in particular at least five, in particular at least 10, in particular at least 20, in particular at least 50, in particular at least 100 and in particular at least 120, which each have a reaction space and are each connected via a first connecting opening to the preliminary space allows direct, in particular linear, scaling of the reactor power. It is also possible for more than 120 reaction tubes to be provided. The heat transfer space is configured, in particular, as intermediate space between the reaction tubes and the reactor housing. As a result of the introduction of the carrier medium via the preliminary space, uniform, in particular identical, flow of carrier medium around all reaction tubes is ensured. The flow conditions in the preliminary space and in the adjoining reaction tubes are thereby homogenized and thus improved. The reactor apparatus has improved flow conditions with good heat input. An interior pressure prevailing in the preliminary space can be applied in a uniformly distributed manner over all reaction spaces. Pressure differences between the reaction spaces are small compared to the interior pressure in the preliminary space and thus do not have any influence on the reactions in the reaction tubes. The pressure difference between the interior pressure in the preliminary space and the respective pressures in the reaction spaces is virtually constant. In particular, all reaction tubes have an identical configuration. The tubes are, in particular, configured as cylindrical tubes. However, other hollow profile shapes, for example a square, rectangular, triangular, pentagonal, hexagonal or other polygonal contour, are also possible. The tubes can also have an oval contour. It is in principle also conceivable for the tubes to be configured differently, in particular with a different contour and/or with different cross-sectional areas.

A reactor apparatus in which the at least one first connecting opening has an internal diameter which is smaller than an internal diameter of the reaction tube connected thereto ensures, in particular, that backmixing from the reaction tubes into the preliminary space and/or bypass flows between the individual reaction tubes are avoided. In particular, the internal diameter of the first connecting opening is not more than 50% of the internal diameter of the reaction tube connected thereto, in particular not more than 40%, in particular not more than 30% and in particular not more than 25%. Owing to the diameter ratio, it is ensured that a pressure drop at each operating point is, for example, greater than 1000 mbar. This defined application of pressure has the effect that the influence of a geodetic pressure difference at various first connecting openings, in particular between a first connecting opening arranged farthest toward the top and a first connecting opening arranged farthest toward the bottom, based on a vertical direction, is virtually negligible. The influence of the geodetic pressure difference is minimized. The equal distribution of the carrier medium into the reaction tubes is improved. A heating unit arranged in the preliminary space in order to heat the carrier medium directly in the preliminary space is advantageous. This ensures that the temperature of the carrier medium in the preliminary space has a required minimum temperature value. This ensures that the viscosity of the carrier medium does not exceed a required maximum value, which is dependent on the temperature. This ensures that the pressure drop is not too great and the carrier medium can flow unhindered from the preliminary space into the reaction tubes. This allows rapid utilization of the reactor apparatus without prior operation, known as a cold start, as a result of the carrier medium present in the preliminary space being preheated. The heating unit is, in particular, arranged in the region of the through-openings and/or the first connecting openings. In this way, the heat can be introduced precisely where it is necessary for the stream of carrier medium flowing into the reaction tubes. It is advantageous for the heating unit to be configured in such a way that the heat can be introduced uniformly into the carrier medium over a large area, in particular over the total cross section of the reactor apparatus. For example, the heating unit has tubular heat transfer elements, in particular in the form of tubes through which heat transfer oil flows. The heat transfer elements can also be electric heating rods or part of an external circuit which conveys heated carrier medium through an inlet opening into the preliminary space and discharges carrier medium from the preliminary space via an exit opening.

A reactor apparatus in which the at least one reaction tube is oriented parallel to a longitudinal axis of the reactor housing ensures advantageous and in particular space-saving arrangement of the reaction tube in the reactor housing. In particular, the reactor apparatus has foot elements on the outside of the reactor housing which allow the reactor apparatus to be set down on a substrate. In addition or as an alternative, fastening devices can be provided in order, for example, to hang up the reactor housing at the side and/or from the top. The fastening elements and/or the foot elements are configured in such a way that it is possible for the reactor apparatus to be aligned so that the longitudinal axis of the reactor housing is oriented substantially horizontally. In particular, the reaction tubes are oriented horizontally.

A reactor apparatus in which the at least one first connecting opening is integrated into a connecting element makes a simplified configuration of the first connecting opening possible. The first connecting opening is a constituent part of the connecting element. In particular, the connecting element is connected at the end face to the reaction tube. The connecting tube is, in particular, plugged into the reaction tube at the end face. The connecting element can be configured as a pin which is inserted, at least partly, into the reaction tube.

A reactor apparatus in which the connecting element is fixed relative to the longitudinal axis of the reactor housing by means of a holding plate ensures reliable and uncomplicated integration of the connecting opening between the preliminary space and the reaction tube. In particular, the holding plate allows direct fixing of a plurality of connecting elements to the associated reaction tube.

A reactor opening having an after-space which has an outflow opening for outflow of at least partially unloaded carrier medium from the after-space and which has at least one second connecting opening for inflow of the unloaded carrier medium from the reaction tube into the after-space allows controlled discharge of the carrier medium.

A reactor apparatus in which the reaction tube is connected via the at least second connecting opening to the after-space makes direct flow of the unloaded carrier medium into the after-space possible.

A reactor apparatus in which the at least one second connecting opening has a cross-sectional area which is smaller than a cross-sectional area of the reaction tube connected thereto ensures that a proportion of the carrier medium remains in the reaction tube. This ensures that the reaction tube is permanently filled with the carrier medium to an adjustable fill level. In particular, the cross-sectional area of the second connecting opening is not more than 60% of the cross-sectional area of the reaction tube, in particular not more than 55%, in particular not more than 50% and in particular not more than 45%. For example, the cross-sectional area of the second connecting opening can have an essentially semicircular disk shape. At the same time, the second connecting opening guarantees that the hydrogen gas liberated during the dehydrogenation reaction can escape via the second connecting opening into the after-space.

A reactor apparatus in which the at least one second connecting opening is integrated into a covering element simplifies the integration of the second connecting opening into the reactor apparatus. The covering element is, in particular, connected at the end face to the reaction tube and, in particular, configured so as to adjoin the reaction tube at the end face.

The covering element is, in particular, a weir which is configured so that the at least one reaction tube is partly closed.

A reactor apparatus having a precipitation element assigned to the at least one second connecting opening ensures pre-precipitation of carrier medium, i.e. of liquid, which has been carried out from the reaction tube by liberated hydrogen gas on the basis of inertia effects. The risk of carrier medium entrained in the hydrogen gas stream being unintentionally introduced is reduced. The precipitation element can be arranged as lamellar sheet, in particular in the region of the at least one second connecting opening. Pre-precipitation of liquid droplets is improved thereby.

An additional improvement in the entrained carrier medium particles from the hydrogen gas is made possible by the hydrogen gas being diverted at least once, in particular a number of times, along the flow direction before leaving the reactor housing. For this purpose, a flow-diverting element can be arranged in the region of the precipitation opening. For example, the flow-diverting element is a tube section which has a meandering shape and is connected to the precipitation opening. The flow of the hydrogen gas stream is diverted a number of times by the flow-diverting element. As a result of the inertia of the liquid droplets, these are precipitated from the gas stream. An additional increase in the degree of precipitation can be brought about by means of a barrier element in the form of a close-meshed netted wire mesh which is, in particular, arranged transverse or perpendicular to the flow direction of the hydrogen gas. The netted wire mesh is, in particular, configured so that it offers no or virtually no flow resistance to the hydrogen gas.

The close-meshed knitted wire mesh is, in particular, arranged in the after-space and makes automatic dripping-off into the carrier medium present in the bottom region of the after-space possible.

The precipitation element is, in particular, arranged, in respect of the longitudinal axis, flush with the at least one second connecting opening.

A reactor apparatus in which the precipitation element is fastened to the covering element simplifies the installation and in particular the installation thereof and the aligned arrangement relative to one another thereof. In particular, the precipitation element is fastened, in particular welded, to an end face of the covering element facing away from the reaction tube. The precipitation element can also be joined in a separable manner to the covering element, in particular by means of a screw connection. The production of the covering element and/or of the precipitation element is simplified thereby. Hydrogen gas can flow out of the reaction tube through the second connecting opening in the covering element to the precipitation element. At the precipitation element, proportions of the liquid of the carrier medium are precipitated.

A reactor apparatus in which the precipitation element is arranged at an angle of inclination relative to the longitudinal axis of the reactor housing ensures targeted flow diversion of the hydrogen gas. Owing to the inclined precipitation element, the hydrogen gas is, in particular, diverted vertically downward and thereby, in particular in sections, accelerated in a downward direction. As a result, proportions of the liquid of the carrier medium in the hydrogen gas stream are precipitated better. The angle of inclination is, in particular, greater than 0° and less than 90°. The angle of inclination is, in particular, in the range from 10° to 60° and in particular from 20° to 45°.

A reactor apparatus in which a dehydrogenation catalyst is provided in the reaction tube promotes the dehydrogenation reaction.

A reactor apparatus in which a carrier medium flow direction and a heat transfer flow direction are, at least in sections, oriented crosswise/at right angles relative to one another makes improved heat transfer possible. The overall flow direction in the reactor apparatus is advantageously concurrent. In addition, fixings serving as diversion elements can be provided. Particularly in the region of the diversion elements, crossflow then occurs. Countercurrent or a mixed form of the flow types mentioned is also possible in principle.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is an enlarged side view of a precipitation element plate of the reactor apparatus;

FIG. 8 is a plan view of the precipitation element plate shown in FIG. 7;

FIG. 10 is a view of an in-principle depiction of the mode of operation in the countercurrent process;

FIG. 11 is a view of a depiction corresponding to FIG. 10 of the co-current process;

FIG. 12 is a view of a depiction corresponding to FIG. 10 of the cross-current process;

FIG. 13 is a view of a depiction corresponding to FIG. 10 of a first mixed flow process; and FIG. 14 is a view of a depiction corresponding to FIG. 10 of a further mixed flow process.

DESCRIPTION OF THE PREFERRED EMBODIMENTS

Figure 1:
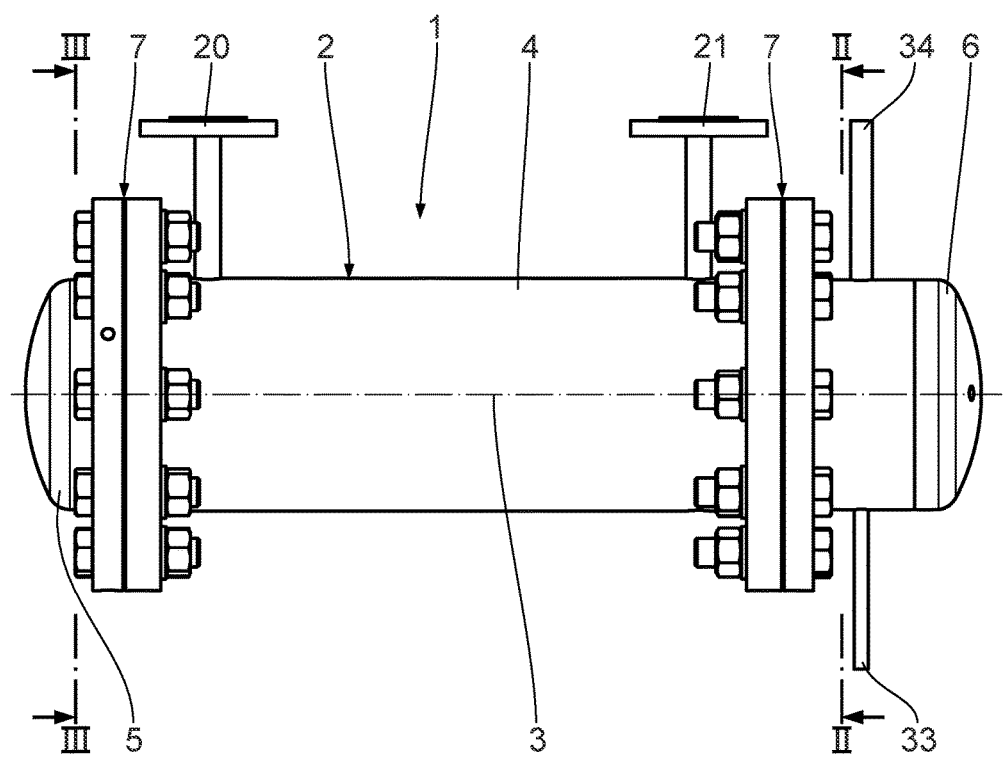
FIG. 1 is a side view of a reactor apparatus according to the present invention.
Figure 2:
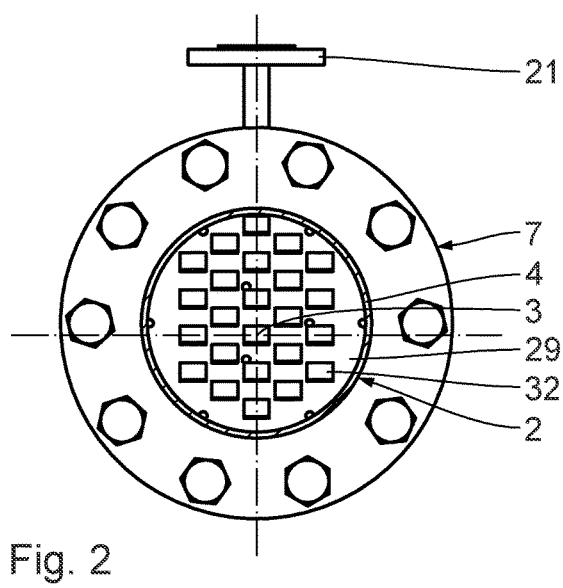
FIG. 2 is a sectional view along the line II-II in FIG. 1.
Figure 3:
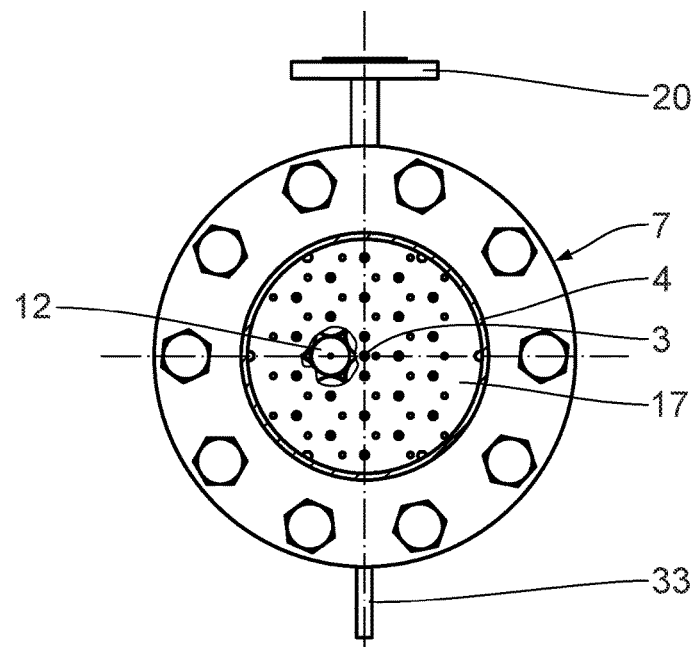
FIG. 3 is a sectional view along the line III-III in FIG. 1.

A reactor apparatus 1 depicted in FIGS. 1 to 10 is employed for dehydrogenating LOHC, i.e. for separating hydrogen gas from LOHC as carrier medium.

The reactor apparatus 1 has a reactor housing 2. The reactor housing 2 has a substantially hollow-cylindrical configuration with a longitudinal axis 3. The reactor housing 2 comprises a hollow-cylindrical reaction housing 4 which is closed at a first end depicted at left in FIG. 1 by means of a preliminary space housing 5 and at an opposite end, depicted at right in FIG. 1, by means of an after-space housing 6. The preliminary space housing 5 and the after-space housing 6 are substantially triangular and are each connected via a flange ring connection 7 to the reaction housing 4 in a pressure-tight and fluid-tight manner.

The reactor housing 2 encloses an interior space which comprises a preliminary space 8, a reaction space 9 and an after-space 10.

The preliminary space 8 has an inflow opening 11 via which loaded carrier medium can get into the preliminary space 8. The inflow opening 11 is arranged on an underside of the reactor housing 2. A filling port which can be connected via a feed conduit to an LOHC tank can be provided on the inflow opening 11.

The reaction space 9 comprises the sum of the internal volumes of a plurality of reaction tubes 12. The reaction tubes 12 are oriented parallel to one another and parallel to the longitudinal axis 3 of the reactor housing 2. The reaction tubes 12 are arranged horizontally. The reaction tubes 12 each have an internal diameter $d_{Ri}$. In the working example shown, twenty-four reaction tubes 12 are provided. It is also possible for more or less than twenty-four reaction tubes to be provided. The greater the number of reaction tubes 12, the greater a dehydrogenation rate, i.e. the volume of hydrogen gas liberated per unit of time. The reaction space 9 thus corresponds to 24 times the interior volume of a reaction tube 12. Two reaction tubes 12 which are adjacent in the vertical direction have a spacing A relative to one another. The spacing A can also be provided in a direction deviating from the vertical direction. The tubes 12 are then arranged relative to one another in a regular pattern.

At an end facing the preliminary space 8, a connecting element 13 is inserted into each of the reaction tubes 12 at the end face. The connecting element 13 has a pin-like configuration, with an external diameter $d_{V1a}$ corresponding substantially to the internal diameter $d_{Ri}$ of the reaction tube 12. The connecting element 13 has a disk-like stop section 14 by means of which the connecting element 13 is held axially on the end face of the reaction tubes 12. Unintended displacement of the connecting element 13 along the longitudinal axis 3 in the direction of the reaction tubes 12 is ruled out.

A holding plate 17 is arranged on an end face of the connecting elements 13 facing the preliminary space 8. The holding plate 17 serves, in particular, for axial fixing of the connecting elements 13 to the reaction tubes 12 along the longitudinal axis 3, in particular to prevent unintended axial displacement in the direction of the preliminary space 8. The holding plate 17 has a plurality of through-openings 18 which are each arranged flush to the connecting openings 16. The through-opening 18 ensures that the first connecting opening 16 in the connecting element 13 is free.

The holding plate 17 is pressed in an axial direction, i.e. along the longitudinal axis 3, onto the reaction tubes 12 at the end face. In this way, the connecting elements 13 with the stop section 14, which forms a stop shoulder, are pressed onto the reaction tubes 12 at the end face. A sealing element which is not shown is provided in each case between the connecting elements 13 and a tube plate 15. The tube plate 15 is welded to the reaction tube 12. The sealing element ensures reliable sealing of the connecting elements 13 in the reaction tubes 12. The spacers 15 are also referred to as tube plates. The tube plate is an integral part of the reactor apparatus 1. Undesired exit of carrier medium from the reaction tubes 12 is prevented. Backflow of carrier medium from the reaction tubes 12 through the first connecting opening 16 into the preliminary space 8 is effectively ruled out because of the capillary effect.

Spacers 15 are arranged between adjacent reaction tubes 12. The spacers 15 can be configured as individual elements. The spacers 15 can also be configured integrally, in particular in the form of a perforated plate into which the reaction tubes 12 are plugged.

The connecting element 13 has an internal hole running right through, which represents a first connecting opening 16. The first connecting opening 16 makes fluid communication between the preliminary space 8 and the reaction space 9 possible. In particular, a first connecting opening 16 is assigned to each reaction tube 12. The first connecting opening 16 has an internal diameter $d_{V1i}$ which is smaller than the internal diameter $d_{Ri}$ of the reaction tube 9. In the working example shown, $d_{V1i}=0.05 \cdot d_{Ri}$. It is advantageous for the internal diameter $d_{V1i}$ of the first connecting opening 16 to be significantly smaller than the internal diameter $d_{Ri}$ of the reaction tube 9, where, in particular: $d_{V1i} \leq 0.02 \cdot d_{Ri}$, in particular $d_{V1i} \leq 0.01 \cdot d_{Ri}$, in particular $d_{V1i} \leq 0.008 \cdot d_{Ri}$. As a result of the internal diameter $d_{V1i}$ of the first connecting opening 16 being smaller than the internal diameter $d_{Ri}$ of the reaction tubes 12, a capillary effect which makes uniform and homogeneously distributed inflow of the carrier medium in the preliminary space 8 into the reaction tubes 12 possible is obtained.

The reactor apparatus 1 is a shell-and-tube reactor with preceding distribution apparatus. The distribution apparatus is formed by the preliminary space 8 and the first connecting openings 16 having a reduced internal diameter $d_{V1i}$ joined thereto.

Figure 4:
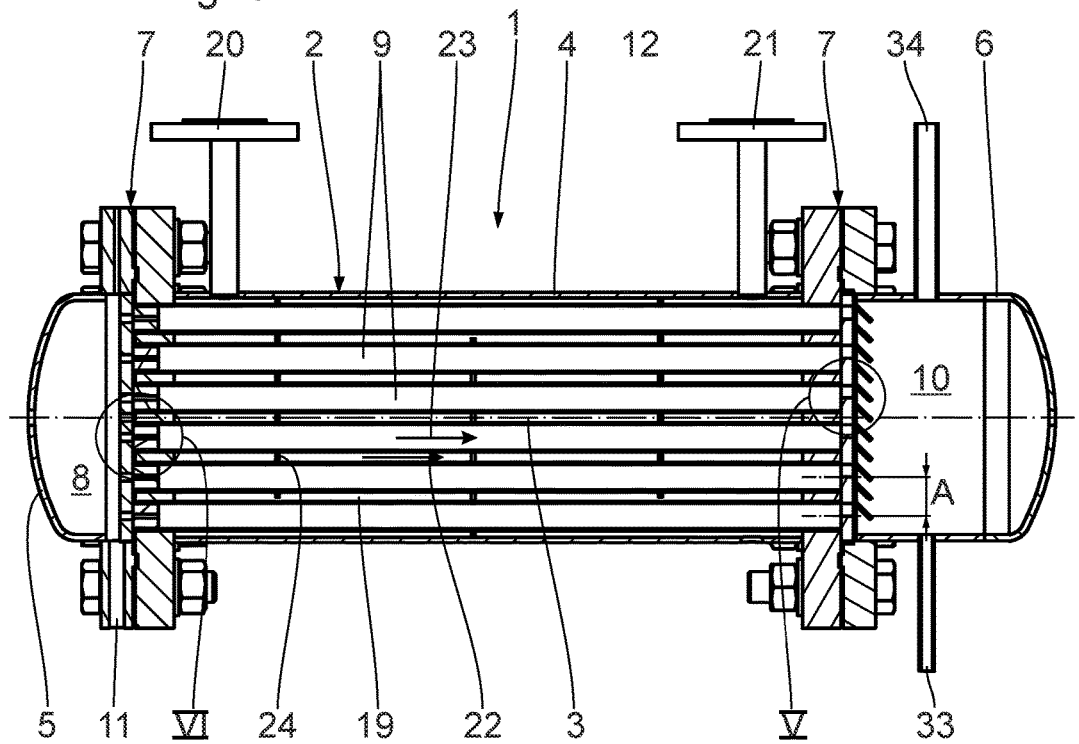
FIG. 4 is a longitudinal sectional view of the reactor apparatus shown in FIG. 1.
Figure 5:
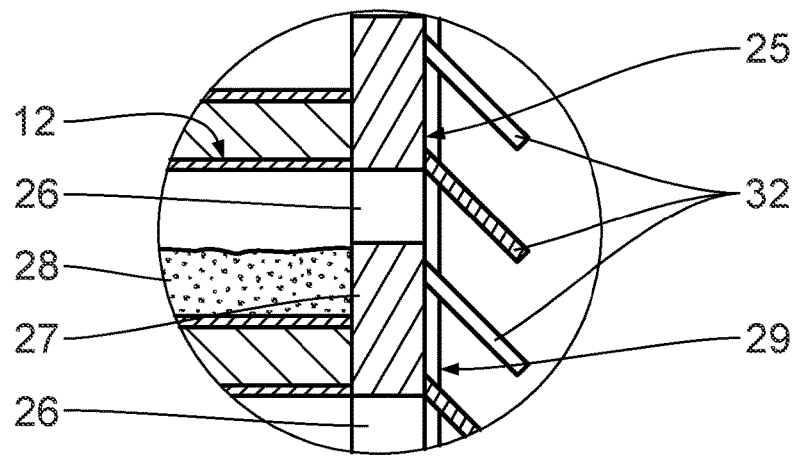
FIG. 5 is an enlarged detailed view corresponding to detail V in FIG. 4.
Figure 6:
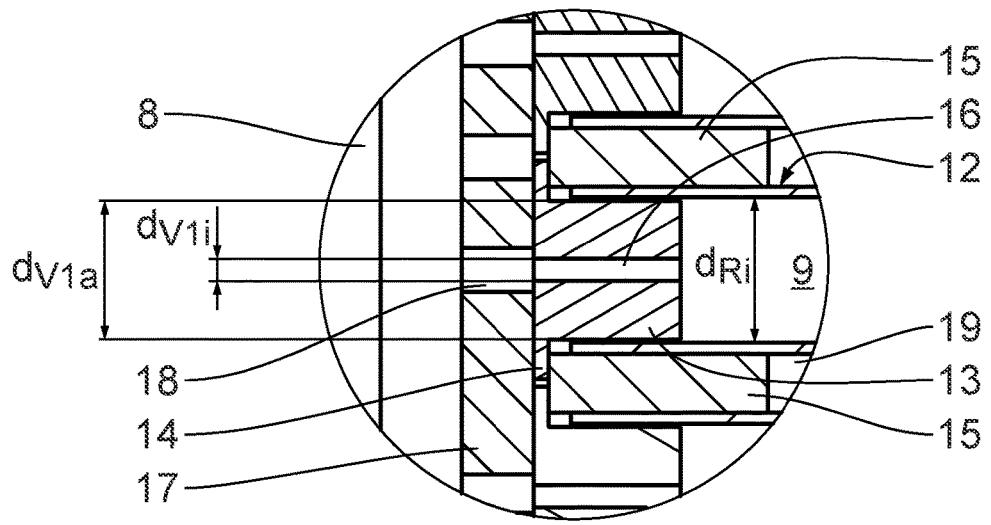
FIG. 6 is an enlarged detailed view corresponding to detail VI in FIG. 4.
Figure 9:
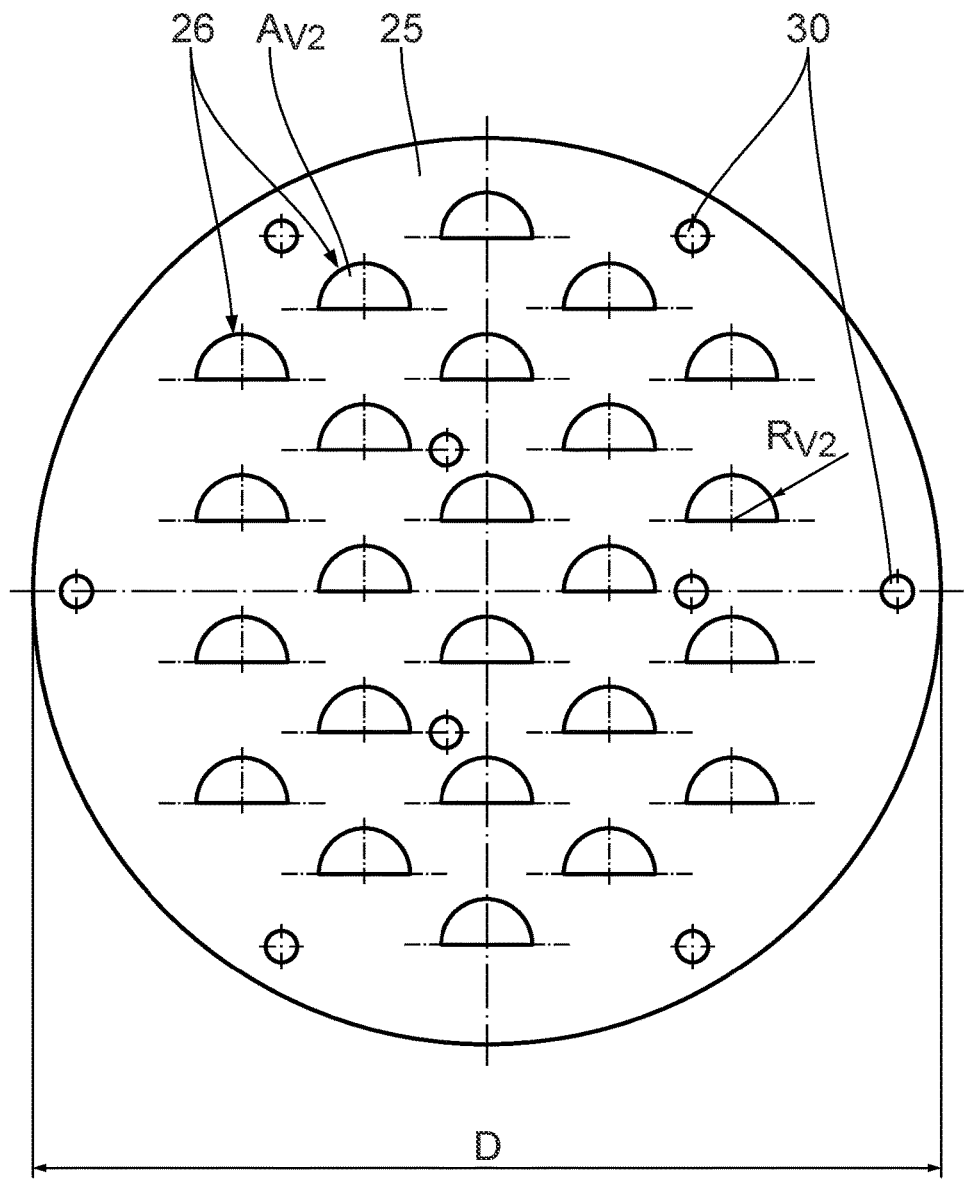
FIG. 9 is an enlarged view of a covering element plate of the reactor apparatus.

Within the reaction housing 14, the reaction tubes 12 are arranged parallel to one another and at a distance from one another in a direction transverse to the longitudinal axis 3. The intermediate space formed between the reaction tubes 12 is a heat transfer space 19. The heat transfer space 19 has a heat transfer medium feed opening 20 and a heat transfer medium discharge opening 21. The heat transfer medium flows essentially from the heat transfer medium feed opening 20 to the heat transfer medium discharge opening 21, as per FIG. 4, i.e. from right to left. The heat transfer medium flow direction 22 is indicated in FIG. 4. The carrier medium which flows along the reaction tubes 12 flows from the preliminary space 8 through the reaction space 9 into the after-space 10, as per the depiction in FIG. 4, i.e. from left to right in the carrier medium flow direction symbolized by the arrow 23. The carrier medium flow direction 23 and the heat transfer medium flow direction 22 are antiparallel. The reactor apparatus 1 is operated in the countercurrent process, which will be explained below.

The reaction tubes 12 are fixed in the reaction housing 4 by means of a plurality of fixings 24. Fixings 24 ensure a defined arrangement of the reaction tubes 12. In particular, the parallel arrangement of the tubes in the reaction housing 4 is ensured. In addition, the fixings 24 are configured in such a way that they influence the flow of the heat transfer medium in such a way that a cross flow is present at least in the region of the fixings. The fixings 24 act as diversion elements.

A plate-like covering element 25 is provided at an end face of the reaction space 9 facing the after-space 10. The covering element 25 has a plurality of second connecting openings 26 which are each assigned to a reaction tube 12. Via the second connecting opening 26, the reaction tube 12 joined thereto is connected to the after-space 10. The second connecting opening has a cross-sectional area $A_{V2}$. The second connecting opening 26 has a substantially semicircular shape. The radius $R_{V2}$ of the second connecting opening 26 corresponds substantially to half the internal diameter $d_{Ri}$ of the reaction tube 12. The cross-sectional area of the second connecting opening 26 therefore corresponds substantially to half the cross-sectional area of the reaction tube 12. The second connecting opening 26 is, in respect of a vertical orientation, aligned on the reaction tube 12 in such a way that a semicircular section arranged at the top is left open by the second connecting opening 26. A semicircular section of the reaction tube 12 arranged underneath is closed by a covering section 27 of the covering element 25. This means that each reaction tube 12 is essentially half-filled with carrier medium 28. The degree of fill can also be less and be, for example, about 45% or about 40%. Hydrogen gas liberated during the dehydrogenation can ascend unhindered into the free volume section of the reaction tubes 12 above the carrier medium 28 and flow out along the carrier medium flow direction 23 into the preliminary space 10 via the second connecting opening 26.

Along the longitudinal axis 3, a precipitation unit 29 is provided on an end face of the covering element 25 facing away from the reaction tubes 12. The covering element 25 has fastening holes 30 in order to fasten, in particular screw, the covering element 25 to the reactor housing 2. The covering element 25 and the precipitation unit 29 can also be configured in one piece.

The precipitation unit 29 has a support element 31 having a plurality of precipitation elements 32 arranged thereon. Each precipitation element 32 covers a precipitation opening which is not visible in FIG. 8. The precipitation elements 32 can also be fastened, in particular welded, directly to the covering element 25. The precipitation opening corresponds essentially to the second connecting opening 26. The precipitation opening can also have a greater cross-sectional area than the second connecting opening 26. Fundamentally, the precipitation opening should not hinder outflow of the liberated hydrogen gas from the reaction tube 12 into the after-space 10. The support element 31 is a circular disk whose diameter D corresponds substantially to the diameter D of the covering element 25. The covering element 25 and the precipitation unit 29 can be arranged concentrically and flush on the reaction tubes 12 at the end face and be fastened to the reactor housing 2 via the flush fastening openings 30.

The precipitation elements 32 are each configured as rectangular metal strips which are arranged at an angle of inclination n relative to the support element 31. The precipitation elements 32 are inclined downward. In the working example shown, the angle of inclination n is about 30°. The angle of inclination is, in particular, greater than 0° and less than 90°, in particular from 10° to 60° and in particular from 20° to 45°.

The precipitation elements 32 each have a height H which corresponds to a perpendicular projection of the length L of the precipitation elements 32 onto the plane of the support element 31. The height H of the precipitation elements 32 is, in particular, in the range from $d_{Ri}/2$ and $d_{Ri}+A$, in particular from $d_{Ri}$ to $(d_{Ri}/2+A)$ and in particular from $d_{Ri}$ and A.

The after-space 10 has an outflow opening 33 for outflow of unloaded carrier medium from the after-space 10. The outflow opening 33 is arranged on a lower bottom side wall of the after-space housing 6. The liquid carrier medium can escape automatically under gravity from the after-space 10. The outflow opening 33 can be connected via an outflow conduit to a storage tank for unloaded LOHC.

The after-space 10 also has a gas outflow opening 34. The gas outflow opening 34 is arranged on an upper side wall of the after-space housing 6. The hydrogen gas formed by the dehydrogenation can escape automatically via the gas outflow opening 34 arranged at the top and be passed to a further use.

A catalyst is arranged in each of the reaction tubes 12. A catalyst suitable for the dehydrogenation of LOHC is known, for example, from EP 1 475 349 A2, the entire contents of which are hereby incorporated by reference.

The mode of operation of the reactor apparatus 1 is explained in more detail below with the aid of FIG. 4. Loaded carrier medium is fed in through the inflow opening 11. The loaded carrier medium is hydrogen-rich. The loaded carrier medium goes into the preliminary space 8 and from there via the capillary-like first connecting openings 16 into a reaction tube 12 in each case. Catalyst material is arranged in the reaction tubes 12. In the reaction space 9, heat is supplied from the heat transfer space 19 via the heat carrier medium. The heat carrier medium here flows counter to the carrier medium in the countercurrent process, as shown schematically in FIG. 10. The countercurrent process is particularly effective in respect of heat transfer. The efficiency of heat transfer is improved.

As a result of the internal diameter of the first connecting opening being reduced in such a way, backflow of the carrier medium from the reaction space 9 into the preliminary space 8 is prevented. Uncontrolled outflow of carrier medium from the reaction space 9 into the after-space 10 is ensured by the covering sections 27 of the covering element 25. A fill level of the carrier medium 28 in the reaction tubes 12 can be fixed as a function of the size, in particular the height, of the covering sections 27.

As a result of a sufficient free volume being available within the individual reaction tubes 9, hydrogen gas which has been separated off can escape via this free volume and through the second connecting openings 26 into the after-space 10. On its route, the hydrogen gas flows around the precipitation elements 32. Proportions of liquid of the carrier medium 28 unintentionally entrained in the gas streams are precipitated thereby. The carrier medium 28 can drip downward on the precipitation elements 32, be collected in a collection space and discharged via the outflow opening 33.

Further flow regimes for operating the reactor apparatus 1 are described below with the aid of FIGS. 11 to 14.

In contrast to the countercurrent process, a co-current process in which the heat transfer medium flow direction 22 and the carrier medium flow direction 23 are oriented parallel and in the same direction is possible. This flow scheme is shown in FIG. 11.

In the case of cross-current operation as per FIG. 12, the carrier medium flow direction 23 is substantially horizontal and the heat transfer medium flow direction 22 is serpentine, essentially transverse thereto. It is advantageous for the heat transfer medium flow direction 22 to be oriented transverse to the carrier medium flow direction 23, but nevertheless horizontal.

In a first mixed flow regime depicted in FIG. 13, the carrier medium flow direction 23 runs along an essentially U-shaped reaction tube conduit 12. This embodiment corresponds essentially to the cross flow as per FIG. 12, with two ends of the reaction tubes 12 located inside the reactor housing 2 being connected to one another via a connecting piece 35 having the shape of an arc of a circle.

The mixed flow regime depicted in FIG. 14 represents a combination of the countercurrent process as per FIG. 10 and the co-current process as per FIG. 11.

While specific embodiments of the invention have been shown and described in detail to illustrate the application of the principles of the invention, it will be understood that the invention may be embodied otherwise without departing from such principles.

The invention claimed is:

1. A reactor apparatus for dehydrogenating a carrier medium, the reactor apparatus comprising:
 a reactor housing, wherein the reactor housing encloses an interior space, the interior space comprising a preliminary space, which has an inflow opening for inflow of loaded carrier medium into the preliminary space and at least one first connecting opening for outflow of the carrier medium from the preliminary space, the interior space further comprising a reaction space connected via the at least one first connecting opening to the preliminary space;
 a heat transfer space arranged between the reactor housing and the reaction space and the heat transfer space containing a heat transfer medium for transfer of heat from the heat transfer medium to the carrier medium; and
 a plurality of reaction tubes, each of the plurality of the reaction tubes having a reaction space and each of the plurality of reaction tubes being connected via a first connecting opening to the preliminary space, the reaction tubes being oriented horizontally, wherein the carrier medium is a liquid.

2. The reactor apparatus as claimed in claim 1, wherein the at least one first connecting opening has an internal diameter which is less than an internal diameter of one of the reaction tubes connected thereto.

3. The reactor apparatus as claimed in claim 1, wherein at least one of the reaction tubes is oriented parallel to a longitudinal axis of the reactor housing.

4. The reactor apparatus as claimed in claim 1, wherein the at least one first connecting opening is integrated into a connecting element.

5. The reactor apparatus as claimed in claim 4, wherein the connecting element is fastened axially by a holding plate to one of the reaction tubes.

6. The reactor apparatus as claimed in claim 1, further comprising:
 an after-space having an outflow opening for outflow of unloaded carrier medium from the after-space and at least one second connecting opening for inflow of the unloaded carrier medium from at least one of the reaction tubes into the after-space.

7. The reactor apparatus as claimed in claim 6, wherein one of the reaction tubes is connected via the at least one second connecting opening to the after-space.

8. The reactor apparatus as claimed in claim 6, wherein the at least one second connecting opening is integrated into a covering element.

9. The reactor apparatus as claimed in claim 1, wherein a dehydrogenation catalyst is provided in at least one of the reaction tubes.

10. The reactor apparatus as claimed in claim 1, wherein a carrier medium flow direction and a heat transfer medium flow direction are, at least in sections, oriented parallel.

11. The reactor apparatus as claimed in claim 2, wherein the internal diameter of the at least one first connecting opening is less than or equal to 0.05 times the internal diameter of the reaction tube.

12. The reactor apparatus as claimed in claim 4, wherein the connecting element is connected at an end face to one of the reaction tubes.

13. The reactor apparatus as claimed in claim 4, wherein the connecting element is plugged into one of the reaction tubes at an end face.

14. The reactor apparatus as claimed in claim 8, wherein the covering element is connected at an end face to one of the reaction tubes.

15. The reactor apparatus as claimed in claim 8, wherein the covering element adjoins one of the reaction tubes at an end face.

16. The reactor apparatus as claimed in claim 1, wherein a carrier medium flow direction and a heat transfer medium flow direction are, at least in sections, oriented cross-current.

17. The reactor apparatus as claimed in claim 1, further comprising:
 a fluid outflow opening located downstream of the reaction tubes with respect to a flow of fluid through one or more of the reaction tubes, the fluid outflow opening being perpendicular to at least one of the reaction tubes.

18. A reactor apparatus for dehydrogenating a carrier medium, the reactor apparatus comprising:
 a reactor housing, wherein the reactor housing encloses an interior space, the interior space comprising a preliminary space, which has an inflow opening for inflow of loaded carrier medium into the preliminary space and at least one first connecting opening for outflow of the carrier medium from the preliminary space, the interior space further comprising a reaction space connected via the at least one first connecting opening to the preliminary space;
 a heat transfer space arranged between the reactor housing and the reaction space and the heat transfer space containing a heat transfer medium for transfer of heat from the heat transfer medium to the carrier medium;
 an after-space having an outflow opening for outflow of unloaded carrier medium from the after-space and at least one second connecting opening for inflow of the unloaded carrier medium from a reaction tube into the after-space, wherein the at least one second connecting opening has a cross-sectional area which is less than a cross-sectional area of the reaction tube connected thereto, wherein the cross-sectional area of the at least one second opening is less than or equal to 0.6 times the cross-sectional area of the reaction tube.

19. A reactor apparatus for dehydrogenating a carrier medium, the reactor apparatus comprising:
 a reactor housing, wherein the reactor housing encloses an interior space, the interior space comprising a preliminary space, which has an inflow opening for inflow of loaded carrier medium into the preliminary space and at least one first connecting opening for outflow of the carrier medium from the preliminary space, the interior space further comprising a reaction space connected via the at least one first connecting opening to the preliminary space;
 a heat transfer space arranged between the reactor housing and the reaction space and the heat transfer space containing a heat transfer medium for transfer of heat from the heat transfer medium to the carrier medium;
 an after-space having an outflow opening for outflow of unloaded carrier medium from the after-space and at least one second connecting opening for inflow of the unloaded carrier medium from a reaction tube into the after-space; and
 a precipitation element assigned to the at least one second connecting opening.

20. The reactor apparatus as claimed in claim 19, wherein the precipitation element is fastened to a covering element.

21. The reactor apparatus as claimed in claim 19, wherein the precipitation element is arranged at an angle of inclination relative to a longitudinal axis of the reactor housing, wherein the angle of inclination is greater than zero degrees and less than ninety degrees.

22. The reactor apparatus as claimed in claim 19, wherein the precipitation element is arranged, with respect of a longitudinal axis of the reactor housing, flush with the at least one second connecting opening.

23. The reactor apparatus as claimed in claim 20, wherein the precipitation element is fastened to an end face of the covering element facing away from the reaction tube.

* * * * *